United States Patent [19]
Gilbert

[11] 4,012,652
[45] Mar. 15, 1977

[54] UNIDIRECTIONAL SELF-STARTING ELECTRICAL MOTORS WITH SHADED POLES AND SHADED MAGNETIC SHUNT

[75] Inventor: John Derek Gilbert, Harlow, England

[73] Assignee: Electrical Remote Control Company, Ltd., England

[22] Filed: Apr. 24, 1974

[21] Appl. No.: 463,506

Related U.S. Application Data

[63] Continuation-in-part of Ser. No. 402,399, Oct. 1, 1973, which is a continuation of Ser. No. 251,264, May 8, 1972, abandoned.

[30] Foreign Application Priority Data

Apr. 26, 1973 United Kingdom ............ 19988/73

[52] U.S. Cl. .............................. 310/162; 318/138
[51] Int. Cl.² ...................................... H02K 19/00
[58] Field of Search .......... 310/162, 163, 164, 172, 310/44, 49, 40 MM, 113, 156, 216; 318/138, 165, 153, 167, 140, 187

[56] References Cited
UNITED STATES PATENTS

| | | | |
|---|---|---|---|
| 1,959,391 | 5/1934 | Spencer | 310/172 |
| 2,695,370 | 11/1954 | Brouwer | 310/44 |
| 2,703,862 | 3/1955 | Gordon | 310/113 |
| 2,803,765 | 8/1957 | Timmerman | 310/216 |
| 2,951,957 | 9/1960 | Eigeman | 310/164 |
| 2,981,855 | 4/1961 | Van Lieshout | 310/162 |
| 3,502,921 | 3/1970 | Suzuki | 310/172 |

*Primary Examiner*—R. Skudy
*Attorney, Agent, or Firm*—Stevens, Davis, Miller & Mosher

[57] ABSTRACT

A unidirectional self-starting synchronous motor comprises a stator having pole teeth of alternating polarity some of which are shaded to provide shaded pole groups alternating with unshaded pole groups. The shaded groups are angularly displaced from a symmetrical position. The total number of effective poles equals the theoretical synchronous number and these are poles divided substantially evenly between the groups. In one case, a shaded shunt is provided as an addition to the shaded groups and a rotor is provided from radially-polarized, anisotropic, ferrite.

32 Claims, 11 Drawing Figures

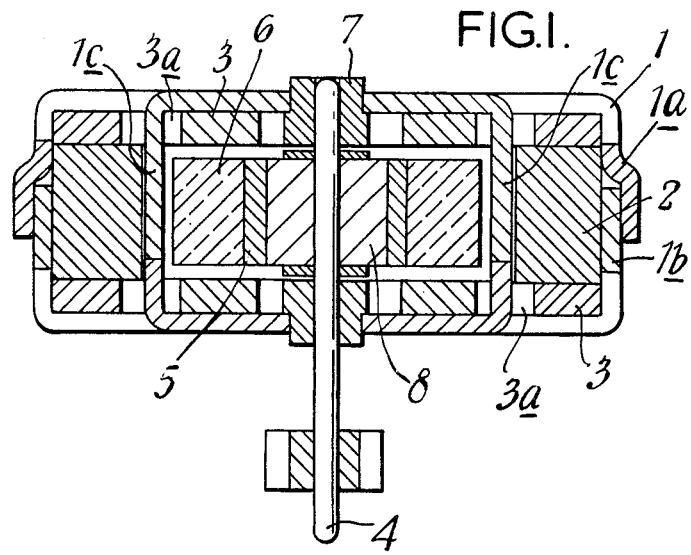
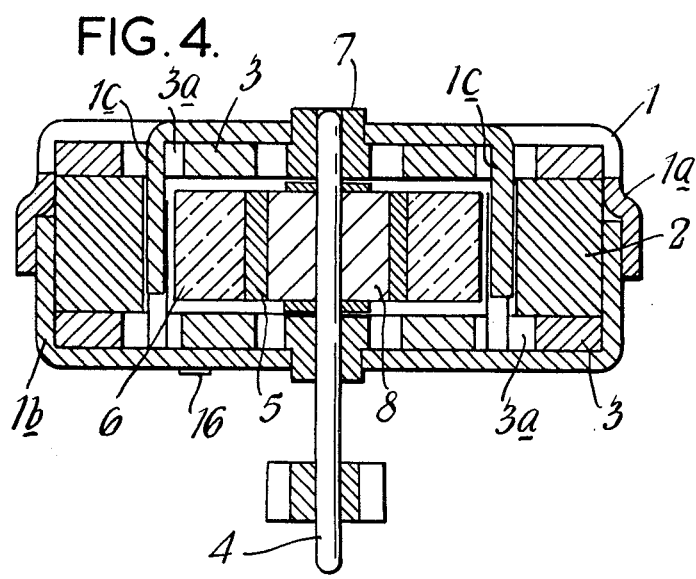

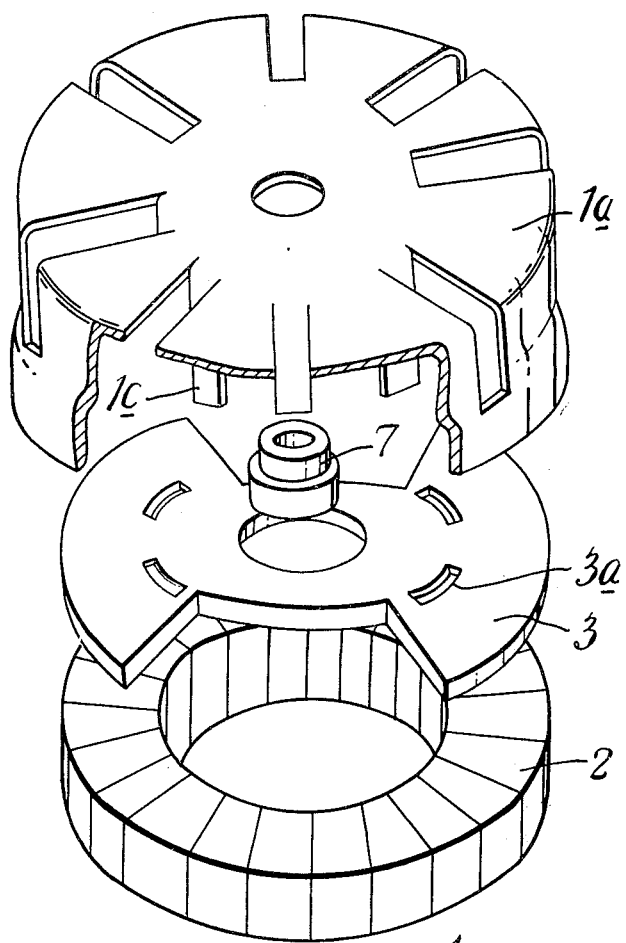
FIG.2.
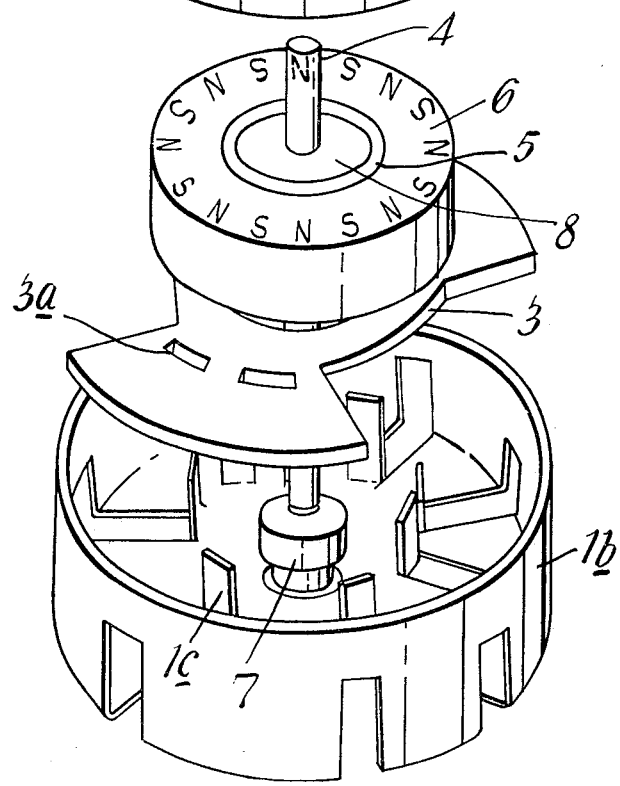

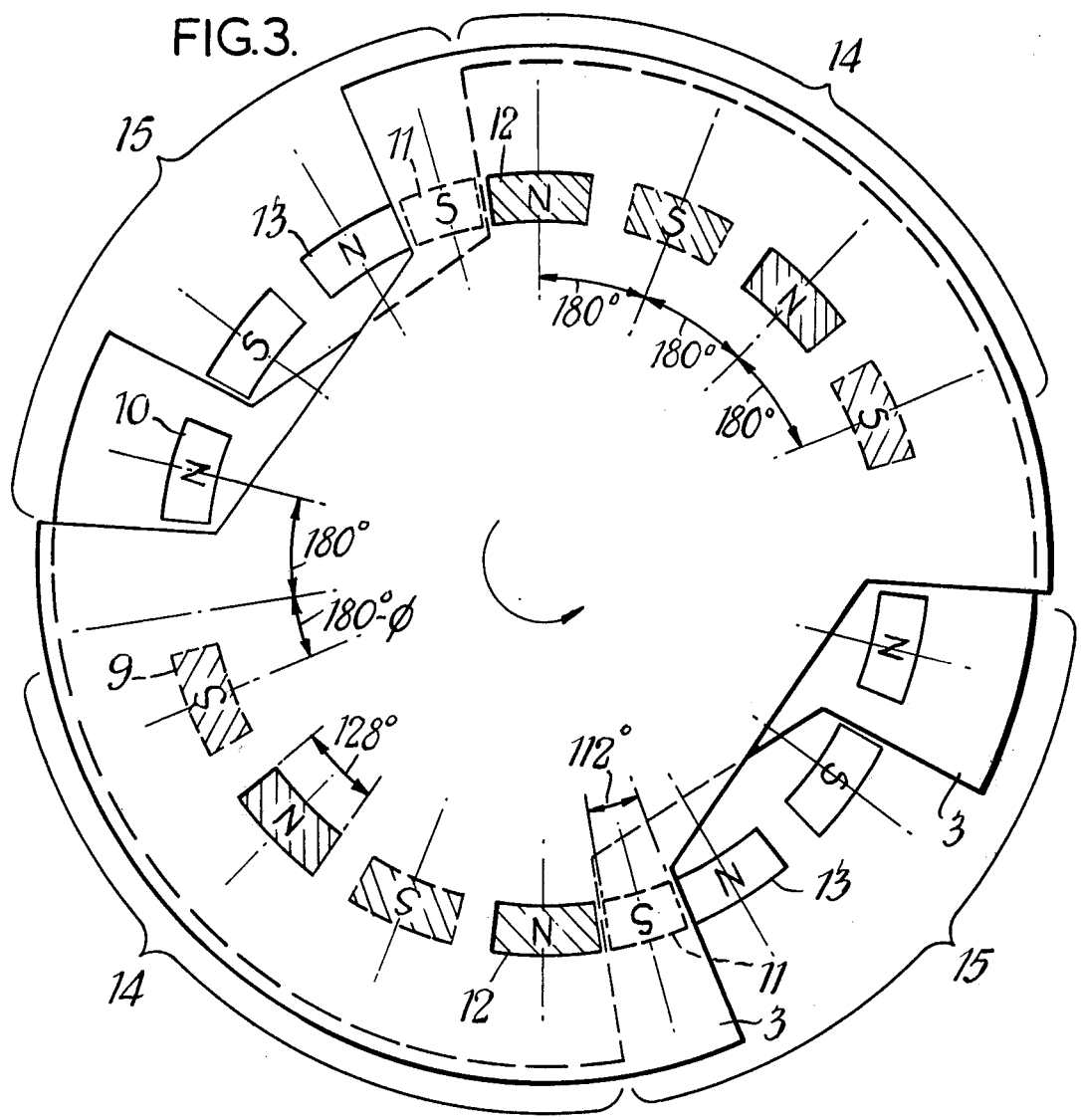

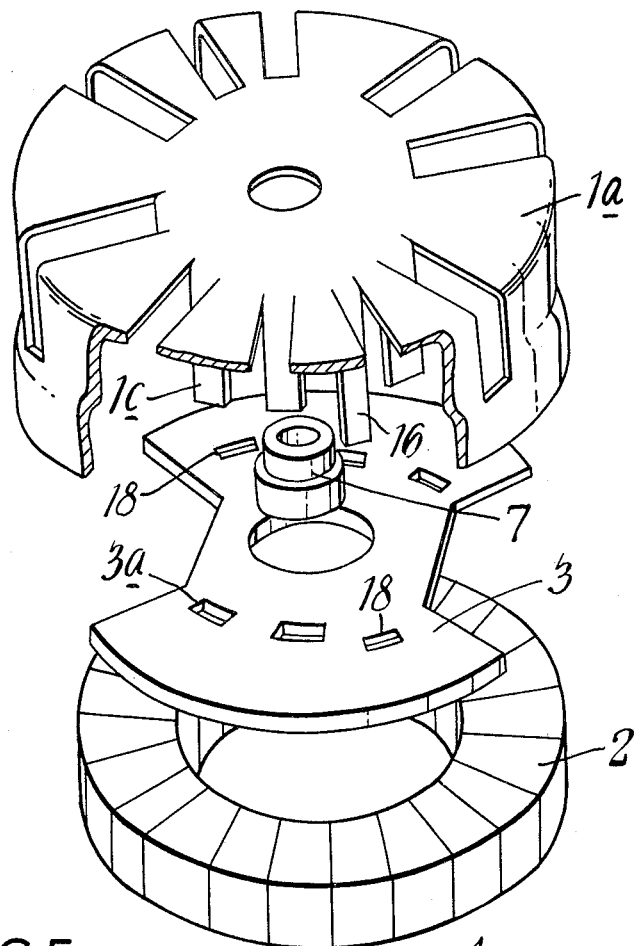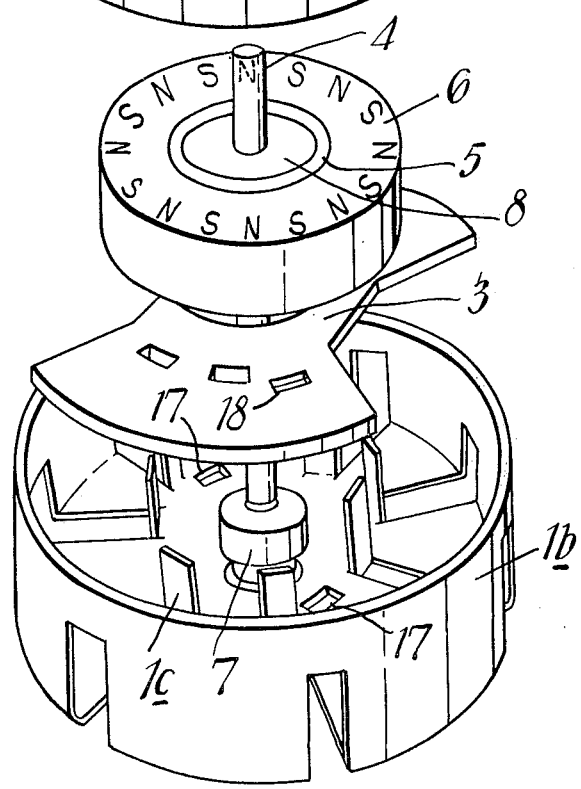
FIG.5.

UNIDIRECTIONAL SELF-STARTING ELECTRICAL MOTORS WITH SHADED POLES AND SHADED MAGNETIC SHUNT

CROSS-REFERENCE TO RELATED APPLICATIONS

This Application is a continuation-in-part of copending U.S. Application Ser. No. 402,399 filed by me on Oct. 1st 1973 for "Unidirectional Self-Starting Electrical Motors," this latter Application being a continuation of abandoned U.S. Application Ser. No. 251,264 filed by me on 8th May 1972 for "Electrical Machines".

BACKGROUND OF THE INVENTION

This invention relates to a unidirectional self-starting synchronously operable motor. British Patent Specification No. 876576 discloses such a motor having a stator with two parts each stator part having a plurality of pole teeth which interdigitate with the pole teeth of the other stator part, some of the poles constituting unshaded or main poles and the other poles being auxiliary poles coupled by shading means such that the axialiary pole teeth will produce a flux phase-shifted by $\phi$ electrical degrees from the fluxes produced by the main pole teeth of the same polarity, and in the assembled stator the interdigitated teeth being in alternate groups of main pole teeth and auxiliary pole teeth whilst the groups of auxiliary pole teeth are angularly spaced from a symmetrical position to define the direction of starting and operation of the motor.

It is a characteristic of that motor that the number of pole teeth is less than the theoretical number $n$ of poles, where $n$ in that case equals number of rotor poles and is twice the number of cycles per second of the motor supply divided by the number of rotor revolutions per second. It is the mean pole pitch or pole set pitch within the groups which determines that speed, from which it follows that $n$ can be defined by the pole pitch or pole set pitch.

Thus, $n$ can be defined as the integer which is substantially equal to 360 divided by the mean pole pitch angle which exists within the majority of pole sets within the groups.

The reduced number of poles in this known motor gives rise to the situation in which the stator has fewer main pole teeth than auxiliary pole teeth to enable the groups of auxiliary pole teeth to adopt their position spaced from the symmetrical position without overlapping main pole teeth, i.e., a main pole teeth is omitted where such overlap would occur. This tends to equalize the flux from the main pole teeth with that from the auxiliary pole teeth, but nevertheless it is felt that the overall efficiency must be reduced by eliminating main poles, as these poles determine the available power of the motor, and by upsetting the natural alternation of the stator poles.

It is thus an object of the invention to improve such synchronous motors.

The object is achieved according to one aspect of the invention in that the number $n$ of stator pole teeth is an integer substantially equal to 360 divided by the mean pole pitch angle which exists within the majority of the pole sets within the groups, that number $n$ being accommodated by virtue of the pole teeth at the trailing end of the at least one group of shaded pole teeth and at the leading end of the at least one group of unshaded pole teeth being dimensioned and positioned so that each pole tooth is accommodated between, and without contact with, its two adjacent pole teeth, the number of said groups being $x$ such that the number of pole teeth in any of said groups is an integer in the range from $n/x - 1$ to $n/x + 1$, and said parts together provide a continuous alternating sequence of north and south poles. It will be seen that each group contains $n/x$ teeth plus or minus one tooth and this is advantageous in that it provides an optimum or near optimum number of unshaded poles to maintain a reasonable torque.

If it is found that the auxiliary and main pole fluxes are undesirably unbalanced as to phase, it is proposed to add to the stator a magnetic shunt which has the effect of increasing $\phi$. This shunt is additional to $n$ pole teeth and, though it might be constructed in the manner of a pole tooth, it is not regarded herein as a pole tooth. This is achieved according to another aspect of the invention in that the number $n$ of stator pole teeth is an integer substantially equal to 360 divided by the main pole pitch angle which exists within the majority of the pole sets within the groups, that number $n$ being accommodated by virtue of the pole teeth at the trailing end of the at least one group of shaded pole teeth and at the leading end of the at least one group of unshaded pole teeth being dimensioned and positioned so that each pole tooth is accommodated between, and without contact with, its two adjacent pole teeth, the number of said group being $x$ such that the number of pole teeth in any said groups is an integer in the range from $n/x - 1$ to $n/x + 1$, and said at least one group of shaded pole teeth has associated with it a shaded magnetic shunt substantially extending from one of said stator parts towards the other. As a consequence of the shunt extending completely to or near to the other stator part, the net driving field of that shunt is zero or negligible in comparison to that of said pole teeth.

In one embodiment, the magnetic shunt extends completely from one stator part to the other. Furthermore, with more than one auxiliary group, each such group of auxiliary pole teeth may have associated with it such a magnetic shunt. The or each shunt may be formed in the manner of a pole tooth but does not act as a pole tooth, and is not regarded as a pole tooth for the purposes of this specification, because the net driving effect of the shunt is zero or negligible in comparison with that of the proper teeth.

There is preferably a magnetic shunt at the leading end of each auxiliary group and advantageously it does not overlap the leading pole tooth of that auxiliary group or the next trailing pole tooth of the adjacent main group. The number of rotor poles is preferably equal to the number of stator poles, of course ignoring any shunt that may have been added.

It has also been found that the efficiency or power of a synchronous machine depends upon the field strength of its rotor. Such rotors have on occasions been made of isotropic ferrite but the field strength of such rotors is nevertheless limited because of their isotropic property.

An improved synchronous machine is provided according to another aspect of the invention with a permanent magnet rotor which is a radially polarized anisotropic ferrite rotor.

A preferred embodiment of synchronous motor incorporates all the afore-mentioned aspects.

DESCRIPTION OF DRAWINGS

For a better understanding of the invention and to show how the same may be carried into effect, reference will now be made, by way of example, to the accompanying drawings, in which:

FIG. 1 is an axial cross-section of a first embodiment of a unidirectional self-starting synchronous motor;

FIG. 2 is an exploded view of the motor of FIG. 1;

FIG. 3 is a diagram showing the arrangement of pole teeth as seen from the outer axial side of one of the shading rings of the motor of FIGS. 1 and 2;

FIG. 4 is an axial cross-section of a second embodiment of a unidirectionally self-starting synchronous motor;

FIG. 5 is an exploded view of the motor of FIG. 4;

With reference to FIGS. 1 and 2, the illustrated motor comprises a mild steel casing 1 formed in two parts, 1a and 1b, each of which carries pole teeth 1c formed as bent cut-outs of the, cup-shaped, parts 1a and 1b. The parts 1a and 1b define together externally of their pole teeth an annular volume containing a stator coil 2. Energization of the coil produces an axial flux in the external flux path provided by the part of the casing 1 surrounding the coil. Accordingly, the pole teeth of one of the casing parts are given a polarity opposite to that of the pole teeth of the other part. These poles interdigitate to give a continuous arrangement of alternating north and south poles (of which there are sixteen in all, i.e., eight on each casing part) so that like poles are not adjacent. Four pole teeth on each casing part are shaded by copper discs 3 having apertures 3a through which the shaded pole teeth pass.

Figure 6:
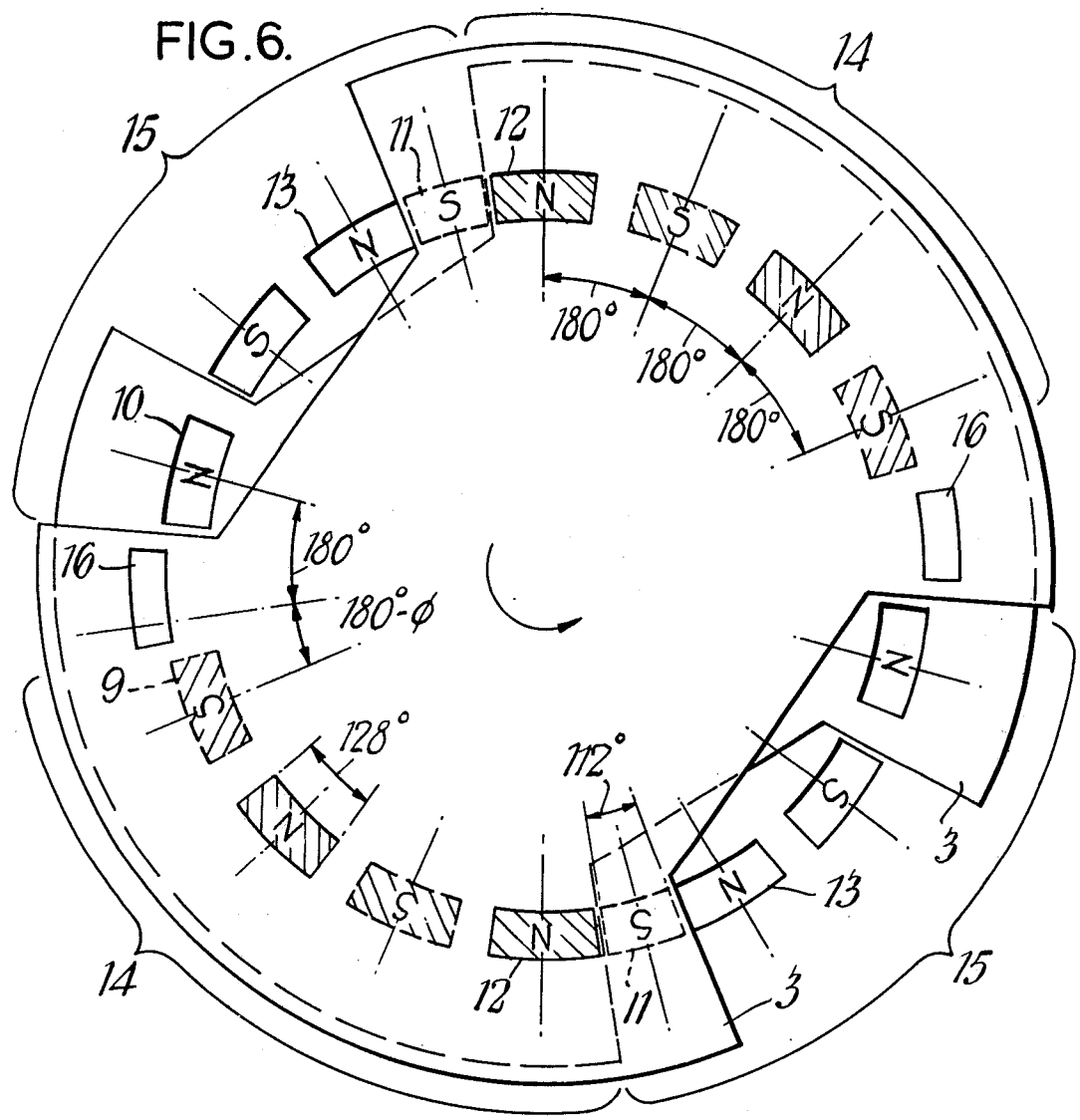
FIG. 6 is a diagram showing the arrangement of pole teeth as seen from the outer axial side of one of the shading rings of the motor of FIGS. 4 and 5.

The casing 1 supports a non-magnetic, stainless steel, shaft 4 via polyamide bearings 7, the shaft carrying a permanent magnet rotor 6 supported of a mild steel core 5 and an injection moulded core 8.

The rotor 6 is a radially polarized anisotropic strontium or barium ferrite member magnetized radially to provide sixteen poles, alternately north and south (as shown in FIG. 2).

To illustrate the positions of the pole teeth, reference will now be made to FIG. 3 which is a diagram of the copper shading discs 3 and the pole teeth viewed from one end of the motor. In this figure, the shaded auxiliary poles are hatched. It will be seen that there are four groups of pole teeth, two groups 14 of auxiliary pole teeth alternating with two groups 15 of main pole teeth. Each group has four pole teeth. As far as possible the pole teeth are equally spaced by 180 electrical degrees but, to achieve unidirectional operation while retaining an equal number of pole teeth in each group with north and south poles alternating around the stator, two departures from even spacing are required.

Firstly, the groups 14 of auxiliary pole teeth are advanced by 180-$\phi$ electrical degrees, i.e. the leading tooth 9 of each auxiliary group is spaced by 360-$\phi$ electrical degrees from the adjacent pole tooth 10 of the preceding main group 15.

Secondly, the leading tooth 11 of each main group 15 is narrowed in width and displaced towards the adjacent tooth 13 in the same group so that it can be accommodated between tooth 12 and the adjacent tooth 13 of the main group without contacting either of teeth 12 and 13. In practice it may also be necessary to narrow the width and displace the axis of at least one of teeth 12 and 13 to accommodate the tooth 11, and if only one of these teeth 12 and 13 need be so modified it is preferred that it be the auxiliary tooth 12. With regard to the specific embodiment, the width of the teeth other than teeth 11 is about 128 electrical degrees (i.e., about 70% of the pole spacing) and the narrowed width of teeth 11 is about 112 electrical degrees (i.e., a reduction of about 12%), while the teeth 11 have their axes displaced from 20 to 30 electrical degrees from the symmetrical position 180 electrical degrees from the adjacent teeth 12 so that teeth 11 are from 150 to 160 electrical degrees from the teeth 12 and 13.

The machine described is basically a shaded pole motor, the shaded poles being in diametrically opposite groups, with unshaded pole groups 15 disposed between the shaded pole groups 14.

The shading is applied to four north poles and four south poles such as to produce a lagging phase shaft relative to the main poles of the same polarity of $\phi$ electrical degrees, where $\phi$ is from 35 to 55 electrical degrees. A magnetic field is thus set up having two components rotating round the air gap of the motor in backward and forward directions at the same speed. However, these components are unequal whereby self-starting in a predetermined direction is guaranteed.

The embodiment just described incorporates no magnetic shunt, i.e., all its poles contribute to the driving field of the motor.

The synchronous motor now to be described with reference to FIGS. 4 to 6 is the same as the preceding embodiment except that it incorporates magnetic shunts.

In this case, the stator part 1a has two extra teeth 16 which extend from the stator part 1a and into contact with, and through respective apertures 17 in, the other stator part 1b. Moreover, each tooth 16 extends through an aperture 18 in each shading disc 3. The teeth 16 therefore constitute shaded magnetic shunts contributing no driving field to the motor.

As will be apparent, each of teeth 16 may be formed on either of the stator parts and it preferably extends into contact with the stator part on which it is not formed. However, in the alternative, a small gap could be left between the teeth 16 and one of the stator parts to achieve substantially the same effect. In either case, the teeth 16 do not act as pole teeth, and are not regarded as pole teeth herein, because their net driving effect in the motor is zero or negligible in comparison with that of the proper pole teeth. Indeed, the teeth 16 act, effectively, as magnetic shunts between the stator parts and their main purpose is to improve the shaded flux phase $\phi$ in the shaded pole groups.

The teeth 16 are shown in FIG. 6 as being at a radius different from that of the proper pole teeth, but the actual radius is not necessarily of importance and could be the same as that of the pole teeth.

It has also been noted that the teeth 16 need not extend completely between the stator parts, so that they could have some definite polarity. However, as they have no appreciable pole action in the motor, any such polarity which they may adopt is not to be regarded as interrupting the natural alternation of polarity provided by the proper pole teeth.

Figure 7:
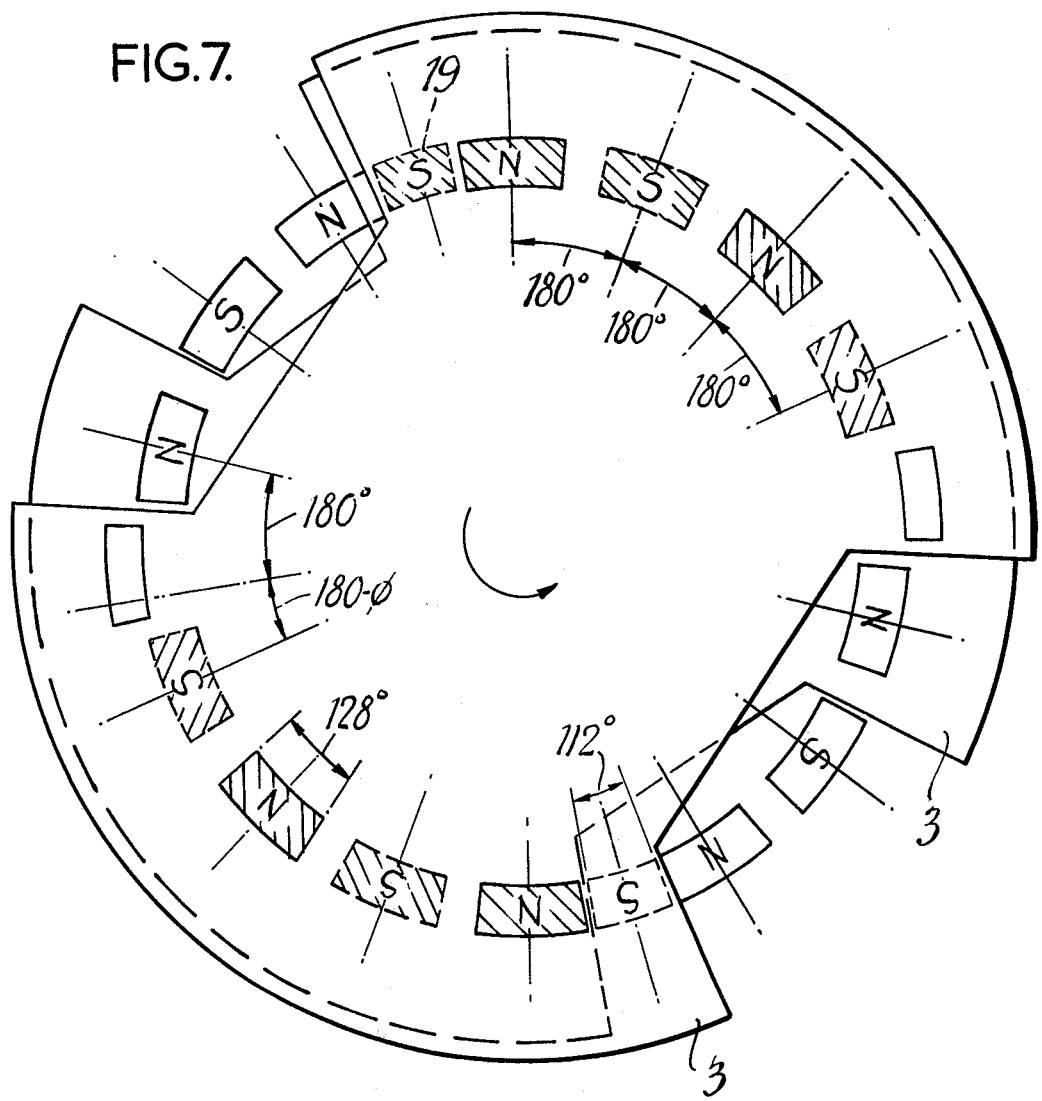
FIG. 7 is a diagram corresponding to FIG. 6 and showing a modification of FIG. 6.

FIG. 7 shows an embodiment which is a modification of that of FIGS. 4 to 6 but adapted to render it more suitable for a wide frequency range. In this case, it is found that by increasing the size of one of the shading discs 3 to shade the pole 19, one achieves an improved flux amplitude balancing to give more consistent unidirectional starting over a wider frequency range, including 60 c/s.

It is possible to utilise the described motors as stepping motors.

Figure 8:
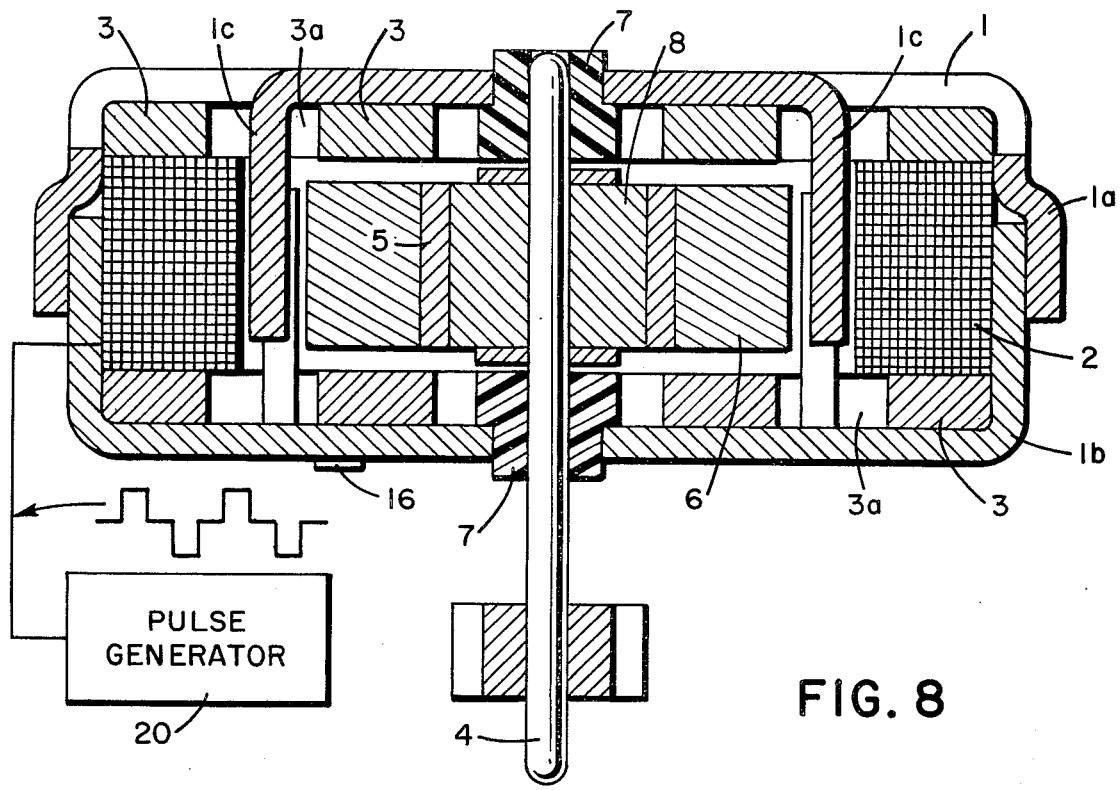
FIGS. 8, 9, 10 and 11 illustrate modifications of the motor of FIG. 4 rendering operable as a stepping motor.

For square-wave the stator coil 2 of either of the motors can be connected to be supplied by a pulse generator 20 operable to produce a.c. pulses, preferably square-wve pulses, as shown in FIG. 8 by way of example with respect to the embodiment of motor shown in FIGS. 4 to 6. The motor shown in FIG. 1 can be connected to an a.c. pulse generator in exactly the same way.

For providing a motor which can be stepped by a single polarity drive signal, the motor itself can be modified in various alternative ways.

Figure 9:
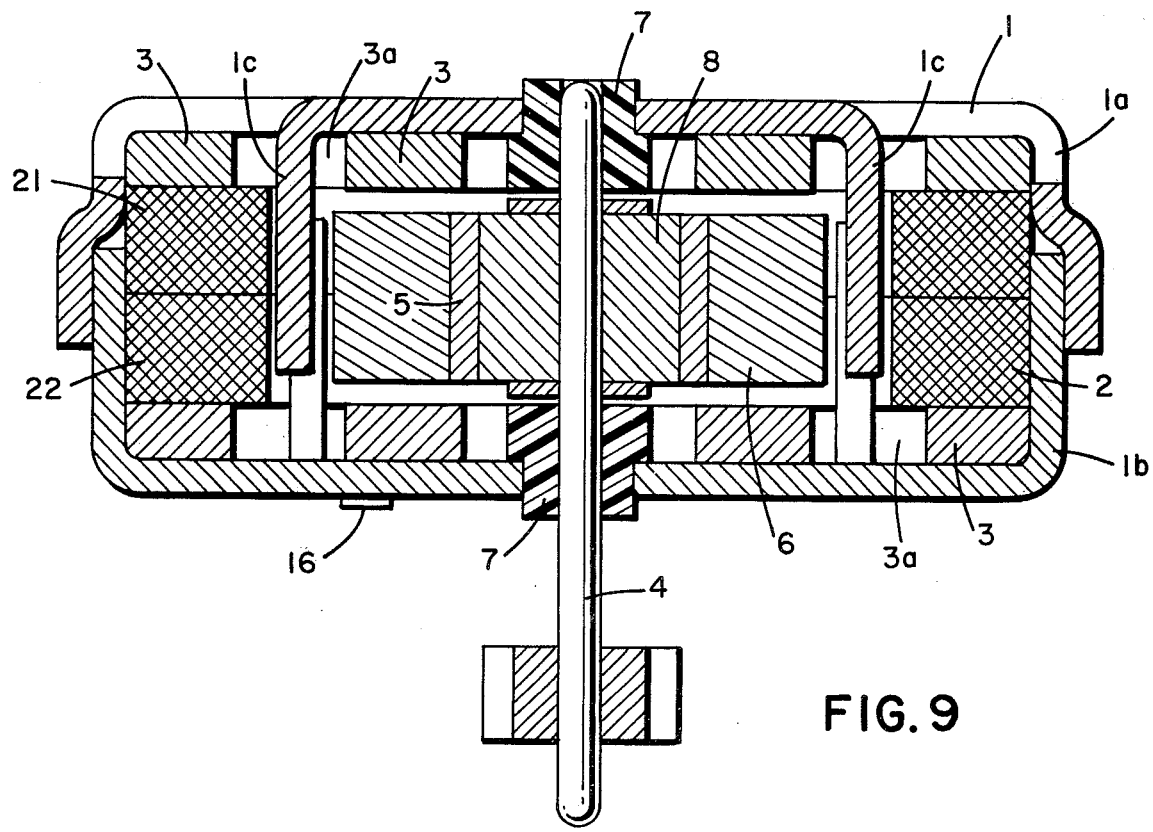

FIG. 9, for example, shows the motor of FIGS. 4 to 6 with the modification that the stator coil 2 comprises two windings 21 and 22 which are would in opposite directions and which are arranged end to end along the axis of the stator coil 2.

Figure 10:
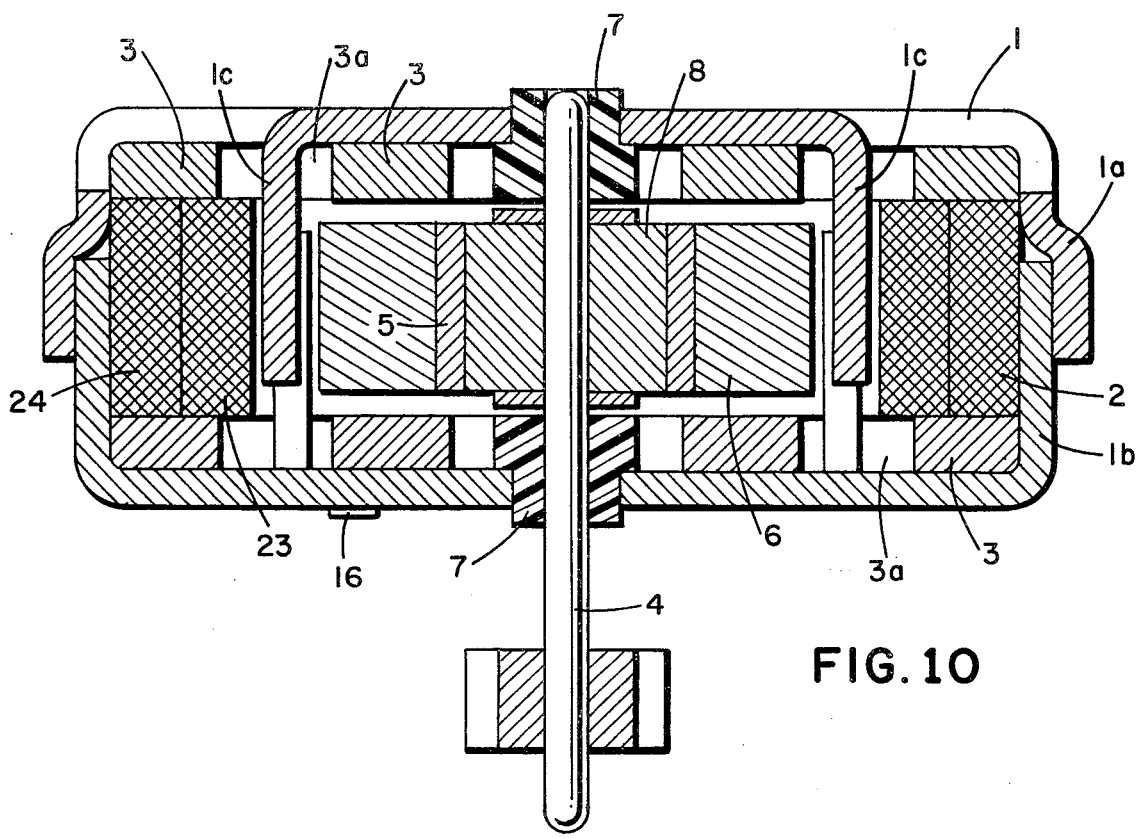

FIG. 10 shows another modification of the motor of FIGS. 4 to 6, in which the stator coil 2 comprises two windings 23 and 24 which are wound in opposite directions, the winding 24 encircling the winding 23.

According to another alternative modification of the motor of FIGS. 4 to 6, the stator coil 2 comprises two windings wound in bifilar fashion, i.e., two lengths of conductor are wound together in the same direction to provide the two windings, the connections to the respective windings being such that pulses fed to one winding via one connection produce a field in one direction, while pulses of the same polarity fed to the other winding by the other connection produce a field in the opposite direction. Since the bifilar coil consists of two windings would in the same direction, FIG. 4 itself serves as an illustration of the bifilar-wound motor.

The three modifications, which have just been discussed, of the motor shown in FIGS. 4 to 6 can equally well be applied to the motor of FIGS. 1 to 3 and 6. Furthermore, the modification of FIG. 7 can, of course, be applied to either of these motors as modified for stepping operation.

The aforementioned three discussed modifications have in common the feature that the modified motor can be made to step by transferring a single polarity drive signal from one to the other of the two windings constituting the stator coil 2. In use, therefore, with a single d.c. pulse generator switching means must be provided for transferring alternate pulses from one to the other of the two windings of the stator coil.

Figure 11:
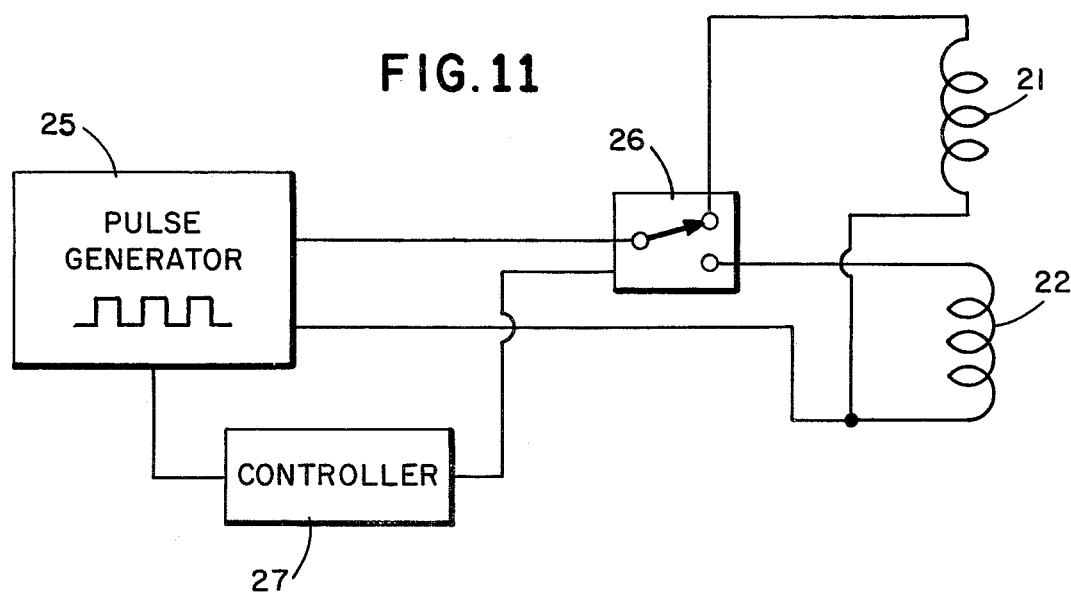

FIG. 11 shows a schematic circuit diagram of windings 21 and 22 of the motor of FIG. 9, in combination with a unidirectional pulse generator 25 connected to feed the windings 21 and 22. An electronic switch 26 (shown diagrammatically) is connected between the pulse generator 25 and the windings 21 and 22 so that in one condition of the switch 26 the pulse generator 25 is connected to feed winding 21, while in the other condition of the switch 26 the pulse generator 25 is connected to feed winding 22. The switch 26 is changed-over, after each pulse it conducts, by a controller 27 which changes-over the switch 26 in response to the trailing edges of pulses from the pulse generator 25.

Similar switching circuitry will be provided for the operation of the motors according to the modification of FIG. 10 and according to the bifilar type of winding arrangement.

Stepping frequencies in the range up to 70Hz are contemplated for the described motors, so that a pulse generator operable in this range will have to be provided.

I claim:

1. A unidirectionally self-starting synchronously-operable motor comprising: a magnetically polarized rotor; and a stator with two parts each having a plurality of pole teeth wherein pole teeth of one stator part interdigitate with the pole teeth of the other stator part, shading means for shading some of said pole teeth so as to provide at least one group of shaded pole teeth and at least one group of unshaded pole teeth, with the groups so disposed around the stator that in proceding around the stator a plurality of times there is encountered an alternate sequence comprising a group of shaded pole teeth followed by a group of unshaded pole teeth, said at least one group of shaded pole teeth being angularly spaced in the direction of rotor rotation from a symmetrical position relative to said at least one group of unshaded pole teeth, the number $n$ of stator pole teeth being an integer substantially equal to 360 divided by the mean pole pitch angle which exists within the majority of the pole sets within the groups, that number n being accommodated by virtue of the pole teeth at the traling end of the at least one group of shaded pole teeth and at the leading end of the at least one group of unshaded pole teeth having circumferential widths and angular displacements relative to the other pole teeth such that each pole tooth is accommodated between, and without contact with, its two adjacent pole teeth, the number of said groups being x such that the number of pole teeth in any of said groups being an integer in the range from $n/x - 1$ to $n/x + 1$, and a shaded magnetic shunt added to at least one group of shaded pole teeth extending substantially from one of said stator parts towards the other.

2. A motor as claimed in claim 1, wherein each of said stator parts has the same number of shaded pole teeth as unshaded pole teeth.

3. A motor as claimed in claim 1, wherein the trailing pole tooth of said at least one group of shaded pole teeth is accommodated between, and without contact with, its two adjacent ones of said pole teeth.

4. A motor as claimed in claim 1, wherein the leading pole tooth of said at least one group of unshaded pole teeth is accommodated between, and without contact with, its two adjacent ones of said pole teeth.

5. A motor as claimed in claim 4, wherein at least one of said two adjacent pole teeth has a width less than that of the majority of said teeth to allow for the accommodation of said leading pole tooth.

6. A motor as claimed in claim 4, wherein said leading pole tooth has a width less then that of the majority of said teeth.

7. A motor as claimed in claim 6, wherein said width of said majority is about 70% of the distance between the centers of the majority of the adjacent pairs of said pole teeth while the width of said pole tooth of lesser width is about 12% less than said width of said majority.

8. A motor as claimed in claim 4, wherein each of said stator parts has the same number of shaded pole teeth as unshaded pole teeth.

9. A motor as claimed in claim 1, wherein the number of rotor poles equals $n$.

10. A motor as claimed in claim 1, wherein n is sixteen.

11. A motor as claimed in claim 4, wherein said at least one group of shaded pole teeth is displaced by about 180-$\phi$ electrical degrees from a symmetrical position.

12. A motor as claimed in claim 1, and comprising a rotor of radially polarized anisotropic ferrite.

13. A motor as claimed in claim 1, wherein said stator is provided with a stator coil comprising two windings both encircling the stator pole teeth whereby the motor can be made to step by transferring a single polarity drive signal from one to the other of said two windings.

14. A motor as claimed in claim 1, wherein said stator is provided with a stator coil consisting of a single winding, there being in combination with said motor an a.c. pulse generator connected to said stator coil, said pulse generator supplying said stator coil with an a.c. pulse train with gaps between the pulses thereby producing stepwise operation of said motor.

15. A motor as claimed in claim 1, wherein said parts together provide a continuously alternating sequence of north and south poles.

16. A motor as claimed in claim 15, wherein said at least one group of shaded pole teeth is displaced by about 180-$\phi$ electrical degrees from a symmetrical position.

17. A motor as claimed in claim 1, comprising at least two groups of said shaded pole teeth each having a shaded magnetic shunt of negligible net driving field.

18. A motor as claimed in claim 17, wherein each of said groups of shaded pole teeth has said magnetic shunt at its leading end.

19. A motor as claimed in claim 18, wherein said shunt is disposed wholly within the angle between the leading pole tooth of its group and the next unshaded pole tooth.

20. A motor as claimed in claim 19, wherein said parts together provide a continuously alternating sequence of north and south poles.

21. A motor as claimed in claim 1, wherein said shunt passes into abutment with the other of said stator parts.

22. A motor as claimed in claim 1, wherein one of said parts has one shading member and the other of said parts has another shading member and said shunt is shaded by both of said shading members.

23. A motor as claimed in claim 1, wherein $x$ is four, one of said shaded groups and one of said unshaped groups has $n/x$ pole teeth, the other of said shaded groups has $n/x + 1$ pole teeth and the other unshaded group, at the trailing end of said other shaded group, has $n/x - 1$ pole teeth.

24. A motor as claimed in claim 18, wherein one of said groups of shaded pole teeth has $n/x + 1$ pole teeth and the group of unshaded poles at the trailing end of said one group has $n/x - 1$ pole teeth.

25. A motor as claimed in claim 24, wherein the others of said groups each has $n/x$ pole teeth.

26. A motor as claimed in claim 1, wherein one of the trailing pole teeth of said at least one group of shaded pole teeth and the leading pole tooth of said at least one group of unshaded pole teeth is accommodated between, and without contact with, its two adjacent ones of said pole teeth.

27. A motor as claimed in claim 23, wherein one of the trailing pole teeth of said at least one group of shaded pole teeth and the leading pole tooth of said at least one group of unshaded pole teeth is accommodated between, and without contact with, its two adjacent ones of said pole teeth.

28. A motor as claimed in claim 13, wherein said two windings are arranged one after the other along the axis of said stator coil.

29. A motor as claimed in claim 13, wherein one of said two windings encircles the other of said two windings.

30. A motor as claimed in claim 13, wherein said two windings are wound in bifilar fashion.

31. A motor as claimed in claim 14, wherein said a.c. pulse generator is a square-wave pulse generator.

32. A motor as claimed in claim 14, wherein said a.c. pulse generator is operable in the range up to 70Hz.

* * * * *